Oct. 12, 1948.　　　　I. E. ALLISON　　　　2,450,928
HAY BALER

Filed Oct. 8, 1945　　　　　　　　　　　　5 Sheets-Sheet 1

FIG. I

Ira E. Allison
INVENTOR.
BY Loyal J. Miller
ATTORNEY

Oct. 12, 1948.   I. E. ALLISON   2,450,928
HAY BALER
Filed Oct. 8, 1945   5 Sheets-Sheet 3

INVENTOR.
Ira E. Allison
BY Loyal J. Miller
ATTORNEY

Oct. 12, 1948.     I. E. ALLISON     2,450,928
HAY BALER

Filed Oct. 8, 1945     5 Sheets-Sheet 4

Ira E. Allison INVENTOR.
BY Loyal J. Miller
ATTORNEY

Oct. 12, 1948.   I. E. ALLISON   2,450,928
HAY BALER

Filed Oct. 8, 1945                                5 Sheets-Sheet 5

Ira E. Allison
INVENTOR.
BY Loyal J. Miller
ATTORNEY

Patented Oct. 12, 1948

2,450,928

UNITED STATES PATENT OFFICE 2,450,928

HAY BALER

Ira E. Allison, McLoud, Okla.

Application October 8, 1945, Serial No. 620,924

4 Claims. (Cl. 100—24)

My invention relates to portable apparatus for baling hay, and more particularly to mechanism for automatically inserting and withdrawing the bale-divider of a hay baling vehicle.

At least one type of hay baler now in extensive use, consists of a vehicle which is drawn over a field of mown hay, picking up the hay as it proceeds. The hay is automatically conveyed to an elongated bale-box or compression chamber where a mechanical ram compresses it. The bale-box in cross section is of a dimension to properly form the top, bottom and two sides of the bale, and is some greater in length than the combined length of two bales. The compressing ram is located adjacent the front end of the box, the rear end of which is open to eject the bales, as the hay is compressed and travels rearwardly through the box.

In order to divide the elongated body of compressed hay so as to form a bale, a divider is thrust into the hay from one side of the box, and travels with the hay toward the rear end thereof. There are two of these dividers used; one for each end of the bale; the one at the leading end of the bale being withdrawn when the bale is wired and tied, and being again inserted into the hay body to form the leading end of the next or following bale.

These dividers, which will be described in detail hereinbelow, are mechanically forced into and withdrawn from the elongated traveling body of compressed hay, but in order that each divider may be forced into the hay body, the injecting mechanism must be manually re-set or "cocked," so that it will be in a position to receive the divider and to again plunge it into the body. The manual re-setting of the injecting mechanism requires a pull of approximately seventy pounds, and the mechanism is so located that the operator must reach out side-wise, about fifteen inches from where he sits, in order to grasp the same and make the re-setting pull. The effort required is so strenuous that it requires a strong man to accomplish it at all, and even a person of considerable strength soon tires and must rest or must be replaced by another operator.

The prime object of the present invention, is to provide a power driven apparatus for automatically re-setting or "cocking" the divider injecting mechanism, in proper timed relation to the speed at which the compressed body of hay is traveling rearwardly in the compression chamber.

It is stated above, that the divider at the leading end of the bale is automatically "withdrawn when the bale is wired and tied." This statement is in part fallacious, since in the usual baler, the divider is only partially withdrawn. It is therefore an important object of the present invention to provide an automatic means for fully withdrawing the leading divider, thus relieving the operator from all responsibility with relation to the withdrawing of the divider.

In the above mentioned hay baler, the dividers not only act to separate the body of compressed hay into divisions of proper length to form the bales, but they also provide lateral channels in the hay body through which the bale tying wires may be passed from one side to the other, so that the bale may be tied.

The divider injecting mechanism of the baler is spring actuated, and it is the tension of the actuating spring which must be overcome in "cocking" the mechanism. In order to decrease the required re-setting pull on the part of the operator, the spring ordinarily lacks sufficient strength to force the divider entirely through the body of compressed hay. The result is that the wire receiving channels of the divider do not extend fully through the hay body, and the wires must therefore be forced beyond the channels through two or three inches of the compressed hay. This materially slows up the baling operation and increases the work of the operator. Since, in the present invention, the divider injecting apparatus is mechanically cocked, the injecting spring may be made with sufficient strength to drive the divider entirely through the hay body, and therefore channels for the baling wire are formed entirely through the same.

Another object of the invention is to provide a mechanism for the purposes disclosed which is comparatively cheap to manufacture.

A further object is to provide a device of this class which is strong and durable.

Other objects will be apparent from the following description when taken in connection with the accompanying five sheets of drawings wherein.

Like characters of reference designate like parts in all of the figures wherein they occur.

In the drawings.

Figure 1:
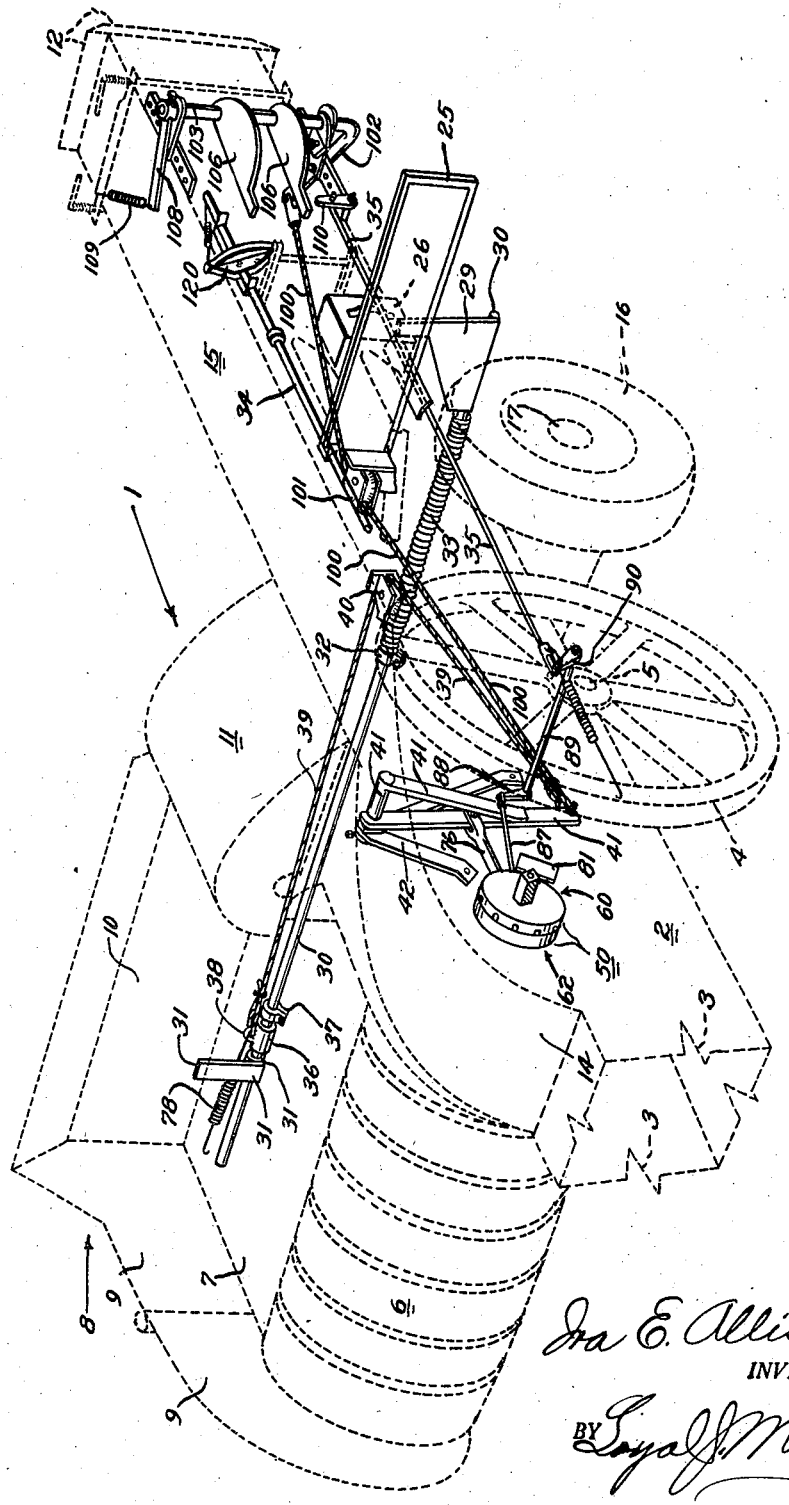
Figure 1 is a perspective view showing in dotted lines a usual hay baling vehicle, and showing in solid lines the apparatus of the present invention, the view being taken in front and to the left hand side of the vehicle.
Figure 2:
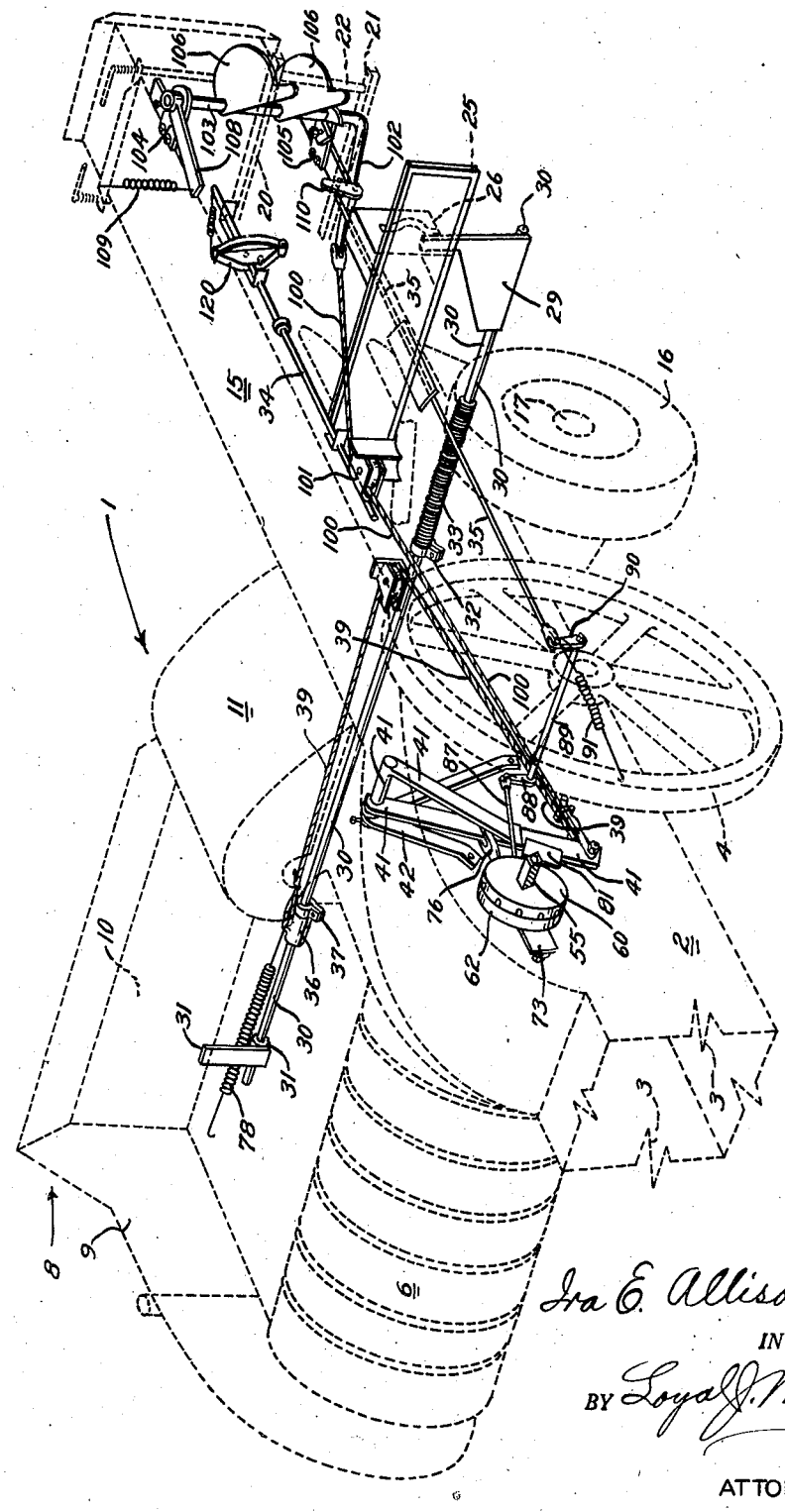
Figure 2 is a similar view showing the apparatus of the invention in a different stage of its operation.

The dotted lines in Figs. 1 and 2 illustrate the major portion of a usual hay baling vehicle which is indicated as a whole by the reference numeral 1. The baler 1 includes an elongated hollow body 2, extending lengthwise with relation to the direction of travel of the same, and the major portion of which is rectangular or substantially square in cross-section. The front or forward end of the body is the end which supports a unit for powering the baling mechanism and is not shown in the drawings, the forward portion of the body having been broken off at the jagged lines 3. The front end of the body also includes a draft coupling means whereby the vehicle may be attached to a tractor for propulsion.

The words "left hand" and "right hand" used herein refer to the respective sides as they would appear to a person standing at the rear of the vehicle and facing forward, or toward the vehicle's direction of travel.

The vehicle is mounted for movement along the earth's surface upon a left hand wheel 4, carried rigidly upon a shaft 5 which projects through the body 1 beyond its right hand side to receive another and similar wheel, not shown.

A pick-up cylinder or gathering drum 6 is rotatably mounted at the right hand side of the body 2 for rollable engagement with the earth's surface. The drum 6 is equipped with projecting spikes and other mechanism not shown, whereby it gathers mown hay from the field, and raises and discharges it upon the floor 7 of a feeder bin 8. The feeder bin has a vertical right hand end wall 9 and a rear wall or back sheet 10. The left hand end of the floor 7 extends leftwardly to the right hand open end of a feeder drum housing 11. A rotatably mounted power driven feeder drum, not shown, occupies the housing 11 and acts to feed hay from the floor 7 into an opening in the right hand side of the body 2 at the rear of the axle 5. The hay is fed into the body 2 at a point substantially midway between the forward end 3 and the rearmost end 12 thereof.

Just forwardly of the housing 11, the body 2 has an enlarged portion with a rounded top 14, and this enlarged portion contains a mechanical ram, not shown, which forcibly urges the hay toward the rear of the body. The portion of the body 2 in which the hay is compressed, or that portion lying to the rear of the housing 11, is termed a bale case, and the bale case, which is indicated by the reference numeral 15, has both its left and right hand sides open. The rear end of the bale case is open to permit ejection of the completed bales upon the ground, or if desired, upon a trailer.

The vehicle is further supported upon a second pair of wheels which lie to the rear of the wheel shaft 5. The left hand one of these wheels is indicated by the reference numeral 16, and is shown as being mounted upon a shaft 17 which passes substantially beneath the body 2, the housing 11 and the feeder floor 7, where it receives at its extreme right hand end, the other wheel of the pair. This other wheel which is like the wheel 16, is located below and to the right hand of the end wall 9 of the feeder 8.

Figure 8:
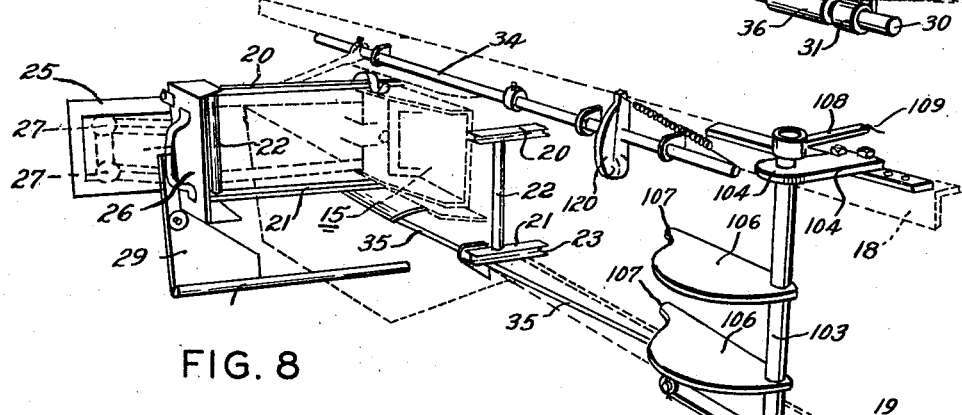
Figure 8 is a fragmentary perspective view showing in dotted lines the left hand side of a baler, and in full lines a portion of the divider inserting mechanism and also the divider withdrawing mechanism; and, Figure 9 is a fragmentary perspective view detailing the operation of the divider withdrawing mechanism of Fig. 8.
Figure 9:
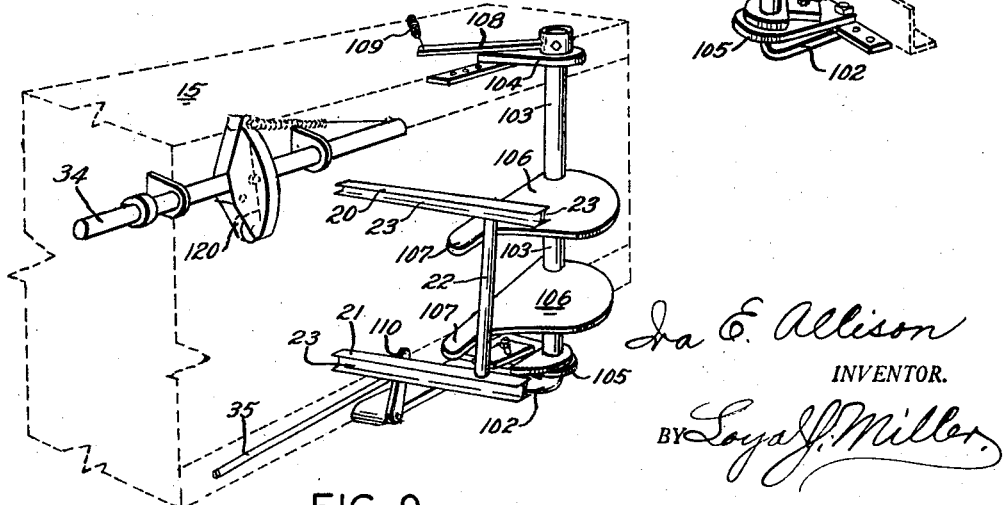

The bale case 15 is formed by four horizontal rearwardly extending angle iron members, each of which extends along one of the corners of the case. The upper left hand one of these corner members is indicated by the reference numeral 18, and the lower left hand one is indicated by 19 (Fig. 8). The top and bottom of the bale case are solid, while the two sides are open except for the vertical flanges of the four corner members.

As the hay enters the body 2 through the side opening under the drum housing 11, and as the mechanical ram under the rounded top 14 of the body compresses the hay, the hay is forced rearwardly into the bale case 15. As more hay is picked up by the gathering drum 6 and is placed by the feeder drum in the path of the ram, the previously compressed hay is forced to travel rearwardly of the vehicle and along the bale case. This, of course, takes place during the time the vehicle is being drawn along the earth's surface.

The bales are permanently formed during their travel rearwardly through the bale case by tying two strands of wire around each bale lengthwise. If some means were not provided for dividing the body of compressed hay into sections or divisions to form the bales, the compressed hay would be ejected from the rear end 12 of the bale case 15 in continuous stream. In order to divide the body of compressed hay so that it may be tied into bales, a divider is thrust into the left hand side of the compressed hay body.

The dividers are conventional, and each consists of two heavy metal parallel prongs or pointed "needles" 20 and 21, which are rigidly attached together in spaced relation by a cross bar 22. The divider is mechanically forced into the compressed hay body from the left hand side thereof so that its two points are located substantially even with the right hand surface of the hay body. The front and rear edges of the needle are provided with longitudinally extending superficial grooves 23 so that the bale wires may be thrust manually along the channels through the hay body.

As mentioned above, the dividers are mechanically thrust through the compressed hay body and this is accomplished by mechanically moving a bale divider box or carriage which supports the divider in proper position for its points to enter the hay body.

The divider thrusting mechanism includes a horizontal track member 25 which projects laterally from the left hand side of the body 2, and is rigidly carried thereby. It also includes a box or carriage 26 which travels along track member 25 on rollers 27 (Fig. 8). A handle 28 is provided on the box 25 so that the box may be manually pulled to the outer end of the track member 25, where it is latched in "cocked" position. Usually the box 26 is pulled outwardly and "cocked" manually, but the present invention anticipates a mechanical means for moving the divider carriage automatically to the left hand end of its travel after it has once plunged the divider through the body of compressed hay.

As a means for mechanically forcibly moving the divider box 26 from the "cocked" position of Fig. 8 to the right hand and toward the bale case, in order to plunge the divider through the hay body, I provide a heavy metal bracket 29 which is welded to the left hand face of the box 26, and which is rigidly carried by the left hand end of a slidable rod 30. The rod 30 extends beneath the vehicle body 2 to the right hand side thereof, and its other or right hand end is slidable within an ear or bearing 31 carried by the lower rear surface of the back sheet 10 of the feeder 8. The rod 30 has a set-collar 32 rigidly mounted thereon, and a helical expansion spring 33 surrounds the rod between the left hand end of the set-collar 32 and the right hand face of a depending projection carried beneath the body 2 adjacent the left hand side thereof. When the rod 30 is at the left hand end of its travel (Fig. 2), the divider carriage is also at the left hand end of its throw or in "cocked" position, and the spring 33 is under compression. A suitable latch not shown, but actuated at the proper time by longitudinal movement of a rod or latch link 34, acts as a means for engaging the carriage and holding it against movement to the right hand, by the force of the spring 33. Actuation of the latch link 34 will be more fully described hereinbelow, but it is stated at this point that release of the latch by the link 34 submits the rod 30, and consequently the divider carriage 26, to right hand movement by action of the spring 33. Such movement is instantaneous, and plunges the divider into and substantially through the compressed body of hay.

As a means for retrieving or re-setting the rod 30 and divider carriage into its left hand or "cocked" position, there is provided around the rod 30 a slip-collar 36 adjacent the right hand end of the rod. The rod 30 is also equipped with a set-collar 37 which lies in the path of the slip-collar 36. The slip-collar 36 has an ear 38 to which is attached one end of a cable 39 which extends over a pulley mechanism 40 mounted on the right hand lower side of the body 2. The other end of the cable 39 is attached to the lower free end of a lever arm 41, the upper horizontal end of which has one end pivoted to the body 2, and the other end pivoted in a bracket 42. When the arm 41 is moved forwardly, as more fully described hereinbelow, the cable 39 is similarly moved and the slip-collar 36 is first moved along the rod 30 into engagement with the set-collar 37, and thereafter the rod 30 is moved in a left hand direction. Such movement of the rod 30 moves the divider carriage to the outer end of its throw, or to the position in which it is shown in Fig. 2. As stated above, such movement of the rod 30 compresses the spring 33.

The means by which the arm 41 is swung to the forward end of its throw, in order to re-set the divider carriage, consists of an automatic clutch mechanism which is indicated, as a whole, by the reference numeral 50.

The clutch mechanism 50 and its connecting mechanism is best detailed in Figs. 3, 4, 5 and 6, and consists substantially of a pedestal type bearing 51, which is rigidly bolted to the right hand face of the body 2 about even with the left hand end of the gathering drum 6, which terminates short of the body 2. The bearing 51 has a tapered portion 52 which projects horizontally from the body 2 and which is centrally bored to journal a horizontal shaft which, within the body 2, is driven by the power unit to continuous rotation when the baler is in operation. This drive shaft is not shown in the drawings, but its right hand end is adapted to be threadedly engaged in internal threads 53, in the left hand end 54 of a square portion 55 of a stub-shaft 56, which has its right hand end portion 57 round in cross-section. A disc 58 is rigidly mounted upon the round portion 57 of the stub-shaft 56 adjacent its junction with the right hand end of the square portion 55, and the disc 58 has an annular peripheral flange 59 which projects toward the right and extends around the round portion 57 of the shaft. The disc 58 and flange 59 combine to constitute the driving member of the clutch, which member is indicated as a whole by the reference numeral 60. The right hand edge of the flange 59 is provided with a plurality of circumferentially spaced notches 61, the office of which will be more fully described hereinbelow. So long as the baler mechanism is in operation, the shaft 56 and driving member 60 are in continual rotation.

The clutch mechanism 50 further includes a driven member or drum which is indicated as a whole by the numeral 62. The driven member 62 consists substantially of a disc portion 63 having a peripheral annular flange 64 which is of a diameter equal substantially to the diameter of the flange 59 of the driving member 60. The right hand surface of the disc portion 63 is equipped with a rigidly mounted axially located tubular sleeve 65 adapted to journal the round portion 57 of the stub-shaft 56. The shaft 56 extends through the disc 63 of the driven member, and a cotter-pin 66 is installed in a transverse perforation 67 in order to hold the driven member 62 with the left hand edge of its flange 64 abutting the right hand notched edge of the flange 59 of the driving member 60.

Within the confines of the flange 64 of the driven member 62, and rigidly mounted on the left hand face of the disc portion 63, there are provided two spaced parallel projections 68, between the outer ends of which is pivotally mounted, upon a pivot pin 69, one end of a latch 70. The free end of the latch 70 nests in a notch 71 in the left hand edge of the flange 64, and a helical spring 72 is adapted to contact the latch 70 and exert a pressure tending to force the latch out of the notch 71 and into the path of the rotating notches 61 in the flange portion 59 of the driving member 60.

The notches 61 are of a depth only equal to or about one-half the width of the latch 70, and consequently when the latch engages within one of the notches 61, a portion of it remains in the notch 71, and the space between the two abutted flanges 59 and 64 is therefore bridged by the latch 70. With this space bridged by the latch 70, the driven member 62 of the clutch mechanism is forced to rotate with the driving member 60.

Figure 3:
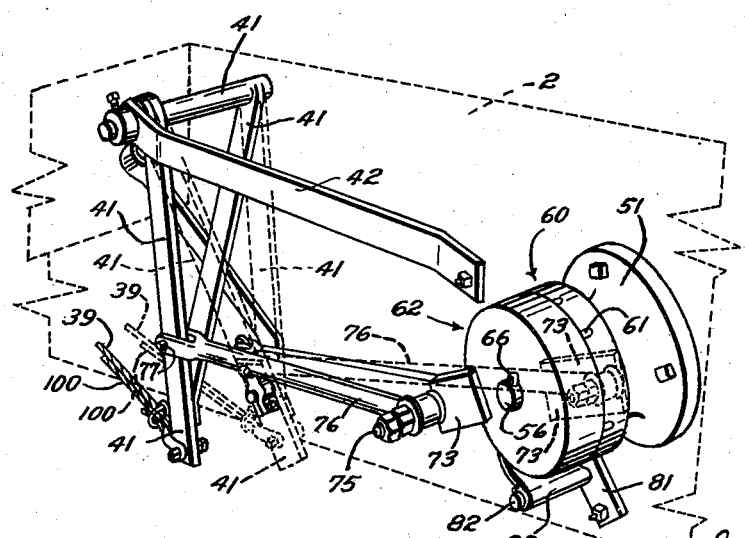
Figure 3 is a perspective view, the solid lines detailing the automatically operated clutch and its associated connections.
Figure 6:
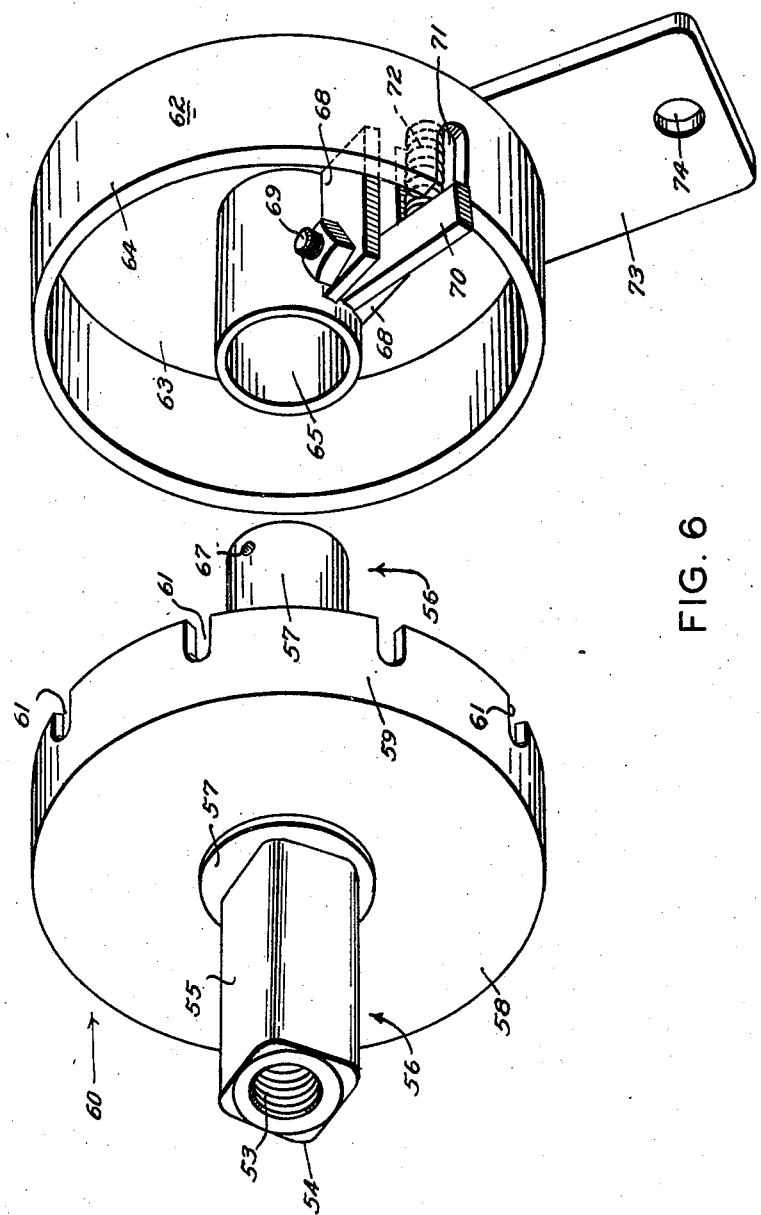
Figure 6 is an enlarged perspective view showing the two body members of the clutch slightly separated, and detailing the interior of the driven member.

The right hand face of the disc portion 63 of the driven member 62 is equipped with a rigidly mounted crank arm 73 which has an end perforation 74 which receives a pivot pin 75 around which is pivotally mounted one end of a pitman 76, the other end of which is bifurcated to straddle the arm 41 of the divider carriage actuating mechanism above described herein (Fig. 3). A pivot pin 77 acts to pivotally connect the pitman 76 to the arm 41.

It is obvious that constant rotation of the driven member 62 will cause the arm 41 to be successively swung forwardly and rearwardly with its upper horizontal portion acting as an axis. Since only the rearward movement of the arm 41 acts, through the cable 39, to "cock" the divider carriage, it is not desirable to have the driven member in continuous rotation, but instead, it is desirable that the arm 41 be swung rearwardly only when the divider carriage is to be "cocked." To this end, rotation of the driven member 62 of the clutch is limited to but one complete revolution at a time. Since the driving member 60 is in constant rotation, and since the driven member 62 is rotated only when the latch 70 is engaging both members, movement of the latch out of the engaged notch 61 will release the driven member 62 so that member 62 may return to its original radial position.

Figure 7:
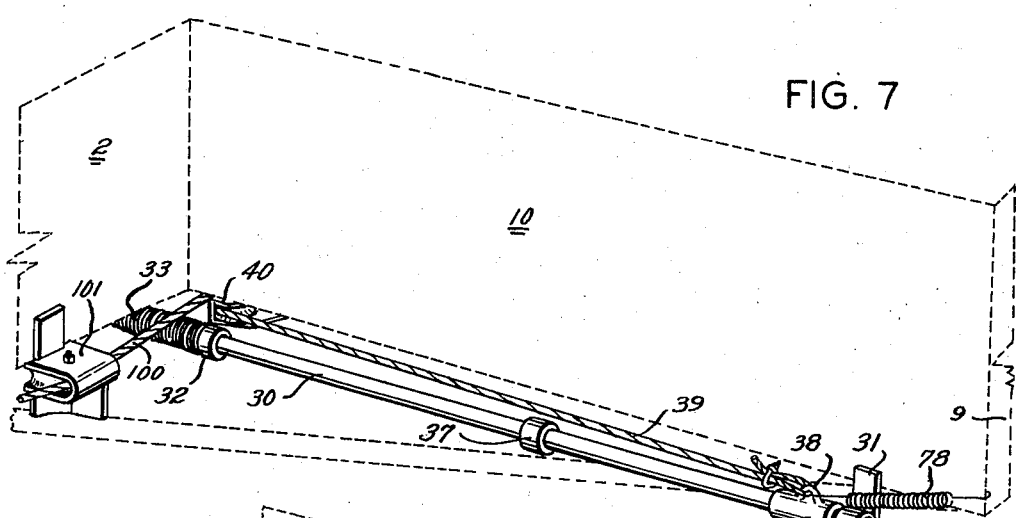
Figure 7 is a fragmentary perspective view showing a portion of a usual baler in dotted lines, and showing the bale divider injecting means in solid lines.

A retrieving spring 78 (Figs. 1, 2 and 7) attached to the slip-collar 36 acts to draw the collar 36 and the cable 39 toward the right hand end of the rod 30, and the lever 41, pitman 76, crank-arm 73 and driven member 62 are thereby returned to their original positions as shown in Fig. 3. Figure 5 shows the clutch member 62 and crank-arm 73 as they appear after a partial revolution has been made, and Fig. 4 shows them as the revolution is just being completed.

Figure 4:
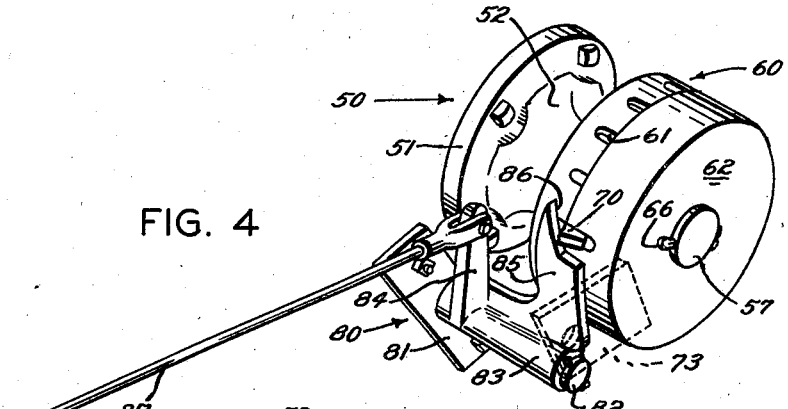
Figure 4 is a perspective view showing the clutch mechanism at the end of its permitted travel and at its point of dis-engagement.
Figure 5:
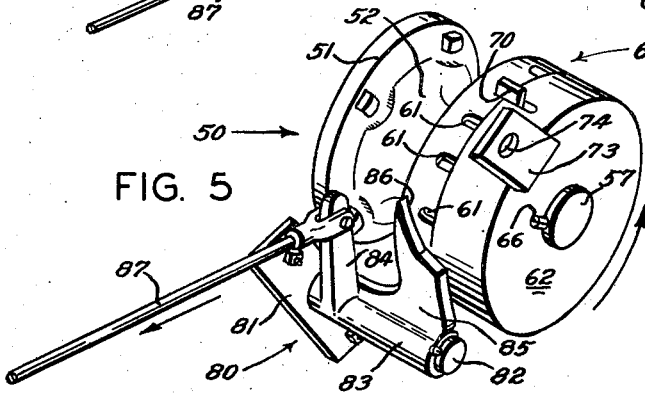
Figure 5 is a similar view showing the clutch mechanism engaged in a position assumed when it has made a partial revolution.

In order to withdraw the latch 70 from its engaged notch 61 in the driving member 60, when the crank-arm 73 has substantially completed one revolution, the trip mechanism 80 of Figs. 4 and 5 is provided.

This trip mechanism 80 consists substantially of a plate 81 welded or otherwise rigidly attached to the right hand surface of the body 2 adjacent the clutch mechanism 50. The plate 81 has a rigidly supported horizontal pivot pin 82 which projects outwardly from the plate 81 in a right hand direction. Upon the pivot pin 82 is rotatably mounted a tubular sleeve 83 having a perpendicular arm 84 at one end, and a similarly projecting trip-plate 85 adjacent its other end. The trip-plate 85 has an arcuate or bevelled edge surface 86 which lies close to the peripheries of the two clutch members 60 and 62 at their abutting edges, and in the path of the latch 70. The surface 86 is so located that when the protruding end of the latch 70 engages it, the latch is moved laterally out of the engaged notch 61. Fig. 4 shows the latch as it is being disengaged by the arcuate surface 86.

Since the sleeve portion 83 of the trip mechanism 80 is pivotally mounted on the pivot pin 82, the trip-plate 85 may be swung forwardly out of the path of the latch 70.

The arm 84 of the trip mechanism 80 is pivotally connected to one end of a link 87 which extends along the right hand side of the body 2 and is pivotally connected at its rear end to the projecting arm 88 of a bell-crank which has a horizontal central portion 89 extending beneath the body 2 to the left side thereof. The left hand end of the central portion 89 of the bell-crank has a perpendicular arm 90, the outer end of which is attached to a helical spring 91 which urges the arm 90 toward the front end of the body 2. The spring 91 therefore acts to normally hold the trip plate 85 of the trip-mechanism 80 in the path of the latch 70 as shown in Fig. 4. The result is that the driving member 60 of the clutch mechanism may normally rotate continuously without driving the driven member 62 to rotation. It is obvious, however, that should the trip plate 85 be moved away from the latch 70, then the spring 72 of the clutch mechanism will urge the latch 70 toward the driving member 60 and into one of the notches 61 therein. When this transpires, the arm 41 will be moved forwardly and the cable 39 will "cock" the divider carriage, as above described.

As soon as the latch 70 is disengaged from the trip-plate 85 and engages in one of the notches 61 of the driving member 60, the spring 91 acts to return the trip-plate to its normal position, so that when the latch has made one complete revolution, it will again be disengaged from the driving member 60. It is therefore evident that rearward movement of the trip-plate 85, and release of the latch 70 to the action of the spring 72 is the means by which "cocking" or re-setting of the divider carriage is controlled. The mechanism by which the trip-plate is moved away from the latch 70 will be more fully described hereinbelow.

It is pointed out that the operation of the divider carriage "cocking" or re-setting mechanism thus far described, is substantially as follows:

With the clutch parts in the positions shown in Fig. 4, the trip-plate 85 holds the latch 70 out of the path of the notches 61 in the driving member 60. The spring 33 on the rod 30 is compressed, and the slip collar 36 is at the left hand end of its travel on the rod 30, with the retrieving spring 78 in stretched condition. Should the rod 30 and bracket 29 have been previously released to the action of the spring 33, and should the trip-plate 85 of the trip mechanism 80 now be simultaneously moved out of engagement with the latch 70, the spring 72 will urge the latch 70 into engagement in one of the notches 61 in the driving member 60, and the driven member 62 will begin a revolution with the driving member. As the driven member makes this revolution, the arm 41 will be moved by the pitman 76 toward the rear of the vehicle which will slacken the cable 39. During this rearward movement of the arm 41 the spring 78 takes up the slack in the cable by moving the slip-collar 36 to the right hand end of its travel on the rod 30.

Immediately upon actuation of the trip-plate 85, as above described, and as soon as the protruding end of the latch 70 has passed the trip-plate, the trip-plate is returned to its original position, as shown in Fig. 4, by action of the spring 91 upon the bell-crank (88—89—90). During the revolution of the driven member 62, the pitman 76 moves the arm 41 toward the rear of the body 2, and this movement pulls upon the cable 39 and causes the slip-collar 36 to contact the set-collar 37 on the rod 30 and move the rod 30 to the left hand end of its travel, thus cocking the divider carriage in position to repeat the operation. When the latch 70 makes one complete revolution with the driven member 62, it will again contact the arcuate surface 86 of the trip-plate 85, and be withdrawn from the notch 61 in the driving member 60.

In considering the above described cycle of operation it must be taken for granted that some suitable means is provided for latching the divider carriage in its "cocked" position, and that prior to the start of the cycle, such latching means was released.

The latching of the divider carriage in "cocked"

position, and its release to the action of the spring 33 is accomplished by the hereinabove described latch link 34 which is slidably carried along the left hand side of the bale box 15. The forward end of the latch-link 34 is pivotally connected to the latch, not shown, which holds the divider carriage in "cocked" position. Forward movement of the latch link 34 acts to release the divider carriage 26. Means for moving the latch-link 34 longitudinally will be more fully described hereinbelow.

The foregoing description explains the construction and operation of the apparatus by which the bale divider is thrust into the compressed body of hay in the bale box, with the exception of the divider carriage releasing means, and also explains the mechanism for "cocking" the divider carriage. The description has not included the mechanism used to withdraw the bale divider from the compressed hay after the bale has been tied, and as the bale reaches the rear end portion of the bale box. This latter operation is accomplished by the above described clutch actuation of the arm 41 in the following described manner.

To the lower end of the arm 41, and beside the cable 39, is also attached a second cable 100 which extends rearwardly along the right hand side of the body 2 through a pulley stirrup 101 attached thereto, extends beneath the bale-box 15 toward the left hand side thereof, where it attaches to the right hand end of a crank-arm 102 (Figs. 1, 2 and 8). The crank arm 102 extends horizontally beneath the bale-box 15 and at the left hand side of the bale-box, the crank arm has a vertical portion 103 which is journalled in suitable upper and lower bearing brackets 104 and 105.

Intermediate the ends of the vertical portion 103 of the crank arm 102 are provided two identical rigidly mounted ejector arms 106 which are plate-like in form, and which lie with their edges normally presented horizontally along the left hand surface of the compressed body of hay. The ejector-arms have their free forward end portions reduced in width to form points 107 so that as the divider moves with the compressed hay body rearwardly of the bale-box 15, the points will engage between the hay body and the cross-bar 22 of the divider.

The upper end of the vertical portion 103 of the crank-arm 102 is equipped with a rigidly mounted horizontal arm 108 to the outer end of which is connected a spring 109 for urging the arm 108 and the crank-arm 102 toward the rear of the bale-box. The spring 109 thus holds the ejector-arms 106 in close proximity to the hay body.

The relative arrangement of the crank-arm 102, the ejector-arms 106, the cable 100, and the arm 41 is such that when the arm 41 is moved forwardly by the clutch mechanism, the ejector-arms 106 are swung outwardly from their normal positions adjacent the hay body, and such outward movement of the ejector arms 106 will act to withdraw the bale divider from the hay body, provided the divider is in such a position that its cross-bar 22 is engaged over the points 107 of the ejector arms.

In order to insure actuation of the arm 41 only when the bale divider is engaged over the points of the ejector-arms 106, the rear end of a link 35 is pivotally connected to one end of a trip-lever 110 which is pivotally mounted on the lower left hand frame member 19 of the bale box 15. The forward end of the link 35 is pivotally connected to the lever arm 90. The upper end of the trip-lever 110 is so located that it lies in the path of the traveling bale divider, and as the divider travels rearwardly in the bale box, along with the body of compressed hay, the divider contacts the trip-lever and forces it rearwardly. Rearward movement of the trip-lever, of course, moves the link 35 rearwardly which results in the movement of the trip-plate 85 to release the clutch latch 70 as above described.

Movement of the trip-lever 110 rearwardly causes the whole cycle of operation of the clutch operated mechanisms, as above described.

In describing the operation of the clutch 50 and its associated mechanisms, namely, the divider carriage "cocking" mechanism and the divider withdrawing mechanism, it was pre-supposed that the divider carriage had previously been released to the thrusting force of the spring 33, and that the divider carriage had first been "sprung," and the forward divider had been thrust into the hay body. It was also stated above that longitudinal movement of the latch-link 34 was the means by which the divider carriage is released or "sprung."

The latch link 34 is moved forwardly to release the divider carriage to the thrusting action of the spring 33, by contact during its rearward travel of the rearmost divider with a lever 120 pivoted to the bale-box 15, and also to the rear end of the latch link 34. The dotted line position of the rearmost bale divider of Fig. 1 shows the divider as it contacts the lever 120 to actuate the latch-link 34 toward forward movement.

It is pointed out that this contact takes place a few inches ahead of the contact of the rear divider with the trip-lever 110 which starts the operation of the clutch 50 through one of its cycles. Consequently, the forward divider is thrust into the hay body a little prior to the time that the divider carriage is again "cocked" and the time at which the rearmost divider is withdrawn from the hay body. In other words, the rear bale divider is withdrawn from the hay body after the actuation of the divider carriage to thrust the other bale divider into the compressed hay body. After that portion of the operative cycle has taken place, the divider carriage is automatically reset or "cocked" for the next operation, and the ejector-arms 106 are simultaneously moved back to their normal positions to again engage the next rearwardly traveling bale divider.

It is thought to be apparent that some changes could well be made in the preferred embodiment of the invention which has been shown in the drawings and described hereinabove, and I therefore do not wish to be confined to the specific structure disclosed hereinabove, further than I am limited by the scope of the appended claims.

It is pointed out that linkage adjustments may be made in the apparatus so that bales of different length can be provided for. Since such adjustable features would fall within the exercise of only mechanical skill, it has not been thought necessary to show them in detail and describe them hereinabove.

I claim:

1. In hay baling apparatus, the combination with mechanism for driving a divider into a body of compressed hay, of; power driven means for re-setting the mechanism; and power driven means for withdrawing the divider from the hay body.

2. In hay baling apparatus, the combination with mechanism for driving a divider into a body of compressed hay, of; power driven means for re-setting the mechanism; and power driven means for withdrawing the divider from the hay body, both of said means being operable in timed relation to each other.

3. In hay baling apparatus, the combination with mechanism for driving a divider into a moving body of compressed hay, of; power driven means for re-setting the mechanism; and power driven means for withdrawing the divider from the hay body, both of said means being operable in timed relation to the movement of the hay body.

4. In hay baling apparatus, the combination with mechanism for driving a divider into a moving body of compressed hay, of; power driven means for re-setting the mechanism; and power driven means for withdrawing the divider from the hay body, both of said means being operable in timed relation to each other, and in timed relation to the movement of the hay body.

IRA E. ALLISON.

REFERENCES CITED

The following references are of record in the file of this patent:

UNITED STATES PATENTS

| Number | Name | Date |
|---|---|---|
| 494,915 | Brown et al. | Apr. 4, 1893 |
| 1,181,497 | Wilder | May 2, 1916 |
| 2,362,861 | Russell | Nov. 14, 1944 |